United States Patent
Cheng et al.

(10) Patent No.: US 8,119,173 B2
(45) Date of Patent: Feb. 21, 2012

(54) METHOD OF FLAVOR ENCAPSULATION THROUGH THE USE OF A DRUM COATER

(75) Inventors: Taiben Cheng, Chesterfield, VA (US);
Greg J. Griscik, Midlothian, VA (US);
Diane L. Gee, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 760 days.

(21) Appl. No.: 12/219,115

(22) Filed: Jul. 16, 2008

(65) Prior Publication Data

US 2009/0035414 A1 Feb. 5, 2009

Related U.S. Application Data

(60) Provisional application No. 60/929,885, filed on Jul. 16, 2007.

(51) Int. Cl.
*B65B 29/02* (2006.01)
(52) U.S. Cl. ............ 426/78; 426/89; 131/347; 131/352
(58) Field of Classification Search ............ 426/78, 426/89; 131/347, 352; 427/422
See application file for complete search history.

(56) References Cited

U.S. PATENT DOCUMENTS

| | | | |
|---|---|---|---|
| 307,537 A | 11/1884 | Foulks | |
| 1,234,279 A | 7/1917 | Buchanan | |
| 1,376,586 A | 5/1921 | Schwartz | |
| 1,992,152 A | 2/1935 | Yeates | |
| 2,313,696 A | 3/1941 | Yates | |
| 2,306,400 A | 12/1942 | Menzel | |
| 2,318,101 A | 5/1943 | Rose | |
| 2,330,361 A | 9/1943 | Howard | |
| 2,528,778 A | 11/1950 | Piazze | |
| 3,067,068 A | 12/1962 | Finberg | |
| 3,162,199 A | 12/1964 | Moll, Jr. | |
| 3,174,889 A | 3/1965 | Anderson et al. | |
| 3,188,265 A | 6/1965 | Charbonneau et al. | |
| 3,369,551 A | 2/1968 | Carroll | |
| 3,415,286 A | 12/1968 | Arnold et al. | |
| 3,600,807 A | 8/1971 | Sipos | |
| 3,607,299 A | 9/1971 | Bolt | |
| 3,692,536 A | 9/1972 | Fant | |
| 3,757,798 A * | 9/1973 | Lambert ................ 131/270 |
| 3,846,569 A | 11/1974 | Kaplan | |
| 3,932,192 A | 1/1976 | Nakashio et al. | |

(Continued)

FOREIGN PATENT DOCUMENTS

EP 0212234 A2 7/1986

(Continued)

OTHER PUBLICATIONS

International Preliminary Report on Patentability issued Jan. 19, 2010 for PCT/IB2008/002694.

(Continued)

*Primary Examiner* — Rena Dye
*Assistant Examiner* — Chaim Smith
(74) *Attorney, Agent, or Firm* — Buchanan Ingersoll & Rooney PC

(57) ABSTRACT

A method of coating flavorants on oral pouch products is provided. A drum coater containing oral pouch products is rotated. A flavoring solution is sprayed to coat the oral pouch products while the oral pouch products are tumbling in the rotating drum.

18 Claims, 3 Drawing Sheets

U.S. PATENT DOCUMENTS

| | | |
|---|---|---|
| 4,218,286 A | 8/1980 | Jones et al. |
| 4,347,857 A | 9/1982 | Boden |
| 4,545,392 A | 10/1985 | Sensabaugh et al. |
| 4,565,702 A | 1/1986 | Morley et al. |
| 4,607,479 A | 8/1986 | Linden |
| 4,624,269 A | 11/1986 | Story et al. |
| 4,660,577 A | 4/1987 | Sensabaugh et al. |
| 4,703,765 A | 11/1987 | Paules et al. |
| 4,797,287 A | 1/1989 | Pich et al. |
| 4,880,649 A * | 11/1989 | Holzner et al. ............... 426/302 |
| 4,880,697 A | 11/1989 | Caldwell et al. |
| 4,892,483 A | 1/1990 | Douglas, Jr. |
| 4,907,605 A | 3/1990 | Ray et al. |
| 4,917,161 A | 4/1990 | Townend |
| 5,127,208 A | 7/1992 | Custer et al. |
| 5,167,244 A | 12/1992 | Kjerstad |
| 5,174,088 A | 12/1992 | Focke et al. |
| 5,186,185 A | 2/1993 | Mashiko et al. |
| 5,211,985 A | 5/1993 | Shirley, Jr. et al. |
| 5,240,016 A | 8/1993 | Nichols et al. |
| 5,263,999 A | 11/1993 | Baldwin et al. |
| 5,346,734 A | 9/1994 | Wydick, Jr. |
| 5,372,149 A | 12/1994 | Roth et al. |
| 5,387,416 A | 2/1995 | White et al. |
| 5,525,351 A | 6/1996 | Dam |
| 5,549,906 A | 8/1996 | Santus |
| 5,601,716 A | 2/1997 | Heinrich et al. |
| 5,726,161 A | 3/1998 | Whistler |
| 5,763,083 A | 6/1998 | Berrigan |
| 5,773,062 A | 6/1998 | Cirigliano et al. |
| 5,806,408 A | 9/1998 | DeBacker et al. |
| 5,829,453 A | 11/1998 | White et al. |
| 5,921,955 A | 7/1999 | Mazer et al. |
| 5,927,052 A | 7/1999 | Nippes et al. |
| 5,997,691 A | 12/1999 | Gautam et al. |
| 6,021,624 A | 2/2000 | Richison et al. |
| 6,135,120 A | 10/2000 | Löfman et al. |
| 6,143,316 A | 11/2000 | Hayden et al. |
| 6,146,655 A | 11/2000 | Ruben |
| 6,162,516 A | 12/2000 | Derr |
| 6,280,761 B1 | 8/2001 | Santus |
| 6,287,612 B1 | 9/2001 | Mandava et al. |
| 6,325,859 B1 | 12/2001 | De Roos et al. |
| 6,383,475 B1 | 5/2002 | Meyers et al. |
| 6,414,033 B1 | 7/2002 | Sceusa |
| 6,444,253 B1 | 9/2002 | Conklin et al. |
| 6,455,068 B1 | 9/2002 | Licari |
| D489,606 S | 5/2004 | Lofman |
| 6,871,473 B1 | 3/2005 | Dutt et al. |
| 6,878,695 B2 | 4/2005 | Woo et al. |
| 6,895,974 B2 | 5/2005 | Peele |
| 6,942,848 B2 | 9/2005 | Nelson et al. |
| 6,958,429 B2 | 10/2005 | Bruhn et al. |
| 6,982,093 B2 | 1/2006 | Licari |
| 6,984,376 B2 | 1/2006 | Stephenson et al. |
| 7,030,092 B1 | 4/2006 | Levine |
| 7,032,601 B2 | 4/2006 | Atchley et al. |
| 7,090,858 B2 | 8/2006 | Jayaraman |
| 7,186,701 B2 | 3/2007 | Kubota et al. |
| D568,576 S | 5/2008 | Neidle et al. |
| D585,626 S | 2/2009 | Chappell, Sr. et al. |
| 7,584,843 B2 | 9/2009 | Kutsch et al. |
| 2002/0012689 A1 | 1/2002 | Stillman |
| 2002/0170567 A1 | 11/2002 | Rizzotto et al. |
| 2003/0070687 A1* | 4/2003 | Atchley et al. ............... 131/352 |
| 2003/0109492 A1 | 6/2003 | Loftsson |
| 2003/0224090 A1 | 12/2003 | Pearce et al. |
| 2004/0015756 A1 | 1/2004 | Chiu |
| 2004/0018293 A1 | 1/2004 | Popplewell et al. |
| 2004/0037879 A1 | 2/2004 | Adusumilli et al. |
| 2004/0118421 A1 | 6/2004 | Hodin et al. |
| 2004/0123873 A1 | 7/2004 | Calandro et al. |
| 2004/0145261 A1 | 7/2004 | Ganter et al. |
| 2004/0191322 A1 | 9/2004 | Hansson |
| 2004/0191366 A1 | 9/2004 | Mangos et al. |
| 2004/0202698 A1 | 10/2004 | Ramji et al. |
| 2004/0234479 A1 | 11/2004 | Schleifenbaum et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0000531 A1 | 1/2005 | Shi |
| 2005/0003048 A1 | 1/2005 | Pearce et al. |
| 2005/0034738 A1 | 2/2005 | Whalen |
| 2005/0061339 A1 | 3/2005 | Hansson et al. |
| 2005/0100640 A1 | 5/2005 | Pearce |
| 2005/0172976 A1 | 8/2005 | Newman et al. |
| 2005/0178398 A1 | 8/2005 | Breslin et al. |
| 2005/0210615 A1 | 9/2005 | Shastry et al. |
| 2005/0241656 A1 | 11/2005 | Kennison |
| 2005/0244521 A1 | 11/2005 | Strickland et al. |
| 2005/0287249 A1 | 12/2005 | Shukla et al. |
| 2006/0039973 A1 | 2/2006 | Aldritt et al. |
| 2006/0073190 A1 | 4/2006 | Carroll et al. |
| 2006/0118589 A1 | 6/2006 | Arnarp et al. |
| 2006/0144412 A1 | 7/2006 | Mishra et al. |
| 2006/0174901 A1 | 8/2006 | Karles et al. |
| 2006/0191548 A1 | 8/2006 | Strickland et al. |
| 2006/0204598 A1 | 9/2006 | Thompson |
| 2006/0228431 A1 | 10/2006 | Eben et al. |
| 2006/0275344 A1 | 12/2006 | Mody et al. |
| 2007/0000505 A1 | 1/2007 | Zhuang et al. |
| 2007/0012328 A1 | 1/2007 | Winterson et al. |
| 2007/0048431 A1 | 3/2007 | Budwig et al. |
| 2007/0062549 A1 | 3/2007 | Holton, Jr. et al. |
| 2007/0077307 A1 | 4/2007 | Rosenberg et al. |
| 2007/0095356 A1 | 5/2007 | Winterson et al. |
| 2007/0107747 A1 | 5/2007 | Hill et al. |
| 2007/0122526 A1 | 5/2007 | Sweeney et al. |
| 2007/0186941 A1 | 8/2007 | Holton, Jr. et al. |
| 2007/0186942 A1 | 8/2007 | Strickland et al. |
| 2007/0186943 A1 | 8/2007 | Strickland et al. |
| 2007/0186944 A1 | 8/2007 | Strickland et al. |
| 2007/0190157 A1 | 8/2007 | Sanghvi et al. |
| 2007/0207239 A1 | 9/2007 | Neidle et al. |
| 2007/0261707 A1 | 11/2007 | Winterson et al. |
| 2007/0267033 A1 | 11/2007 | Mishra et al. |
| 2007/0298061 A1 | 12/2007 | Boghani et al. |
| 2008/0014303 A1 | 1/2008 | Jacobs et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0081071 A1 | 4/2008 | Sanghvi et al. |
| 2008/0166395 A1 | 7/2008 | Roush |
| 2008/0173317 A1 | 7/2008 | Robinson et al. |
| 2008/0196730 A1 | 8/2008 | Engstrom et al. |
| 2008/0202536 A1 | 8/2008 | Torrence et al. |
| 2008/0302682 A1 | 12/2008 | Engstrom et al. |
| 2008/0308115 A1 | 12/2008 | Zimmermann et al. |
| 2008/0317911 A1 | 12/2008 | Schleef et al. |
| 2009/0004329 A1 | 1/2009 | Gedevanishvili et al. |
| 2009/0022856 A1 | 1/2009 | Cheng et al. |
| 2009/0022917 A1 | 1/2009 | Gedevanishvili et al. |
| 2009/0025740 A1 | 1/2009 | Chappell, Sr. et al. |
| 2009/0025741 A1 | 1/2009 | Crawford et al. |
| 2009/0126746 A1 | 5/2009 | Strickland et al. |
| 2010/0218779 A1 | 9/2010 | Zhuang et al. |
| 2010/0300464 A1 | 12/2010 | Gee et al. |
| 2010/0300465 A1 | 12/2010 | Zimmermann |

FOREIGN PATENT DOCUMENTS

| | | |
|---|---|---|
| EP | 0145499 | 4/1989 |
| EP | 0352107 A2 | 1/1990 |
| EP | 0483500 A1 | 5/1992 |
| EP | 0 422 898 | 9/1994 |
| EP | 0 599 425 | 10/1997 |
| EP | 1010639 A1 | 6/2000 |
| EP | 1118274 A | 7/2001 |
| GB | 725764 | 3/1955 |
| GB | 924052 | 4/1963 |
| GB | 1139684 | 1/1969 |
| GB | 1350740 | 4/1974 |
| GB | 2074838 A | 11/1981 |
| JP | 03-240665 | 10/1991 |
| WO | WO 94/25356 | 11/1994 |
| WO | WO 97/45336 | 12/1997 |
| WO | WO 99/40799 | 8/1999 |
| WO | WO 00/57713 | 10/2000 |

| | | |
|---|---|---|
| WO | WO 01/70591 A1 | 9/2001 |
| WO | WO 02/080707 A1 | 10/2002 |
| WO | WO 03/028492 A1 | 4/2003 |
| WO | WO 03/030881 | 4/2003 |
| WO | WO 03/053175 A2 | 7/2003 |
| WO | WO 2004/009445 | 1/2004 |
| WO | WO 2004/052335 | 6/2004 |
| WO | WO 2004/056219 | 7/2004 |
| WO | WO 2004/058217 | 7/2004 |
| WO | WO 2004/064811 A1 | 8/2004 |
| WO | WO 2004/066986 | 8/2004 |
| WO | WO 2004/095959 A1 | 11/2004 |
| WO | WO 2005/027815 | 3/2005 |
| WO | WO 2005/046363 A | 5/2005 |
| WO | WO 2005/077232 | 8/2005 |
| WO | WO 2005/084446 | 9/2005 |
| WO | WO 2006/004480 | 1/2006 |
| WO | WO2006/039487 A | 4/2006 |
| WO | WO 2006/065192 | 6/2006 |
| WO | WO2006/090290 A | 8/2006 |
| WO | WO 2006/105173 | 10/2006 |
| WO | WO 2006/120570 A2 | 11/2006 |
| WO | WO 2006/127772 A | 11/2006 |
| WO | WO 2007/037962 A | 4/2007 |
| WO | WO 2007/057789 A2 | 5/2007 |
| WO | WO 2007/057791 A2 | 5/2007 |
| WO | WO 2007/082599 A1 | 7/2007 |
| WO | WO 2007/104573 | 9/2007 |
| WO | WO 2007/126361 A1 | 11/2007 |
| WO | WO 2008/016520 A2 | 2/2008 |
| WO | WO 2008/042331 A2 | 4/2008 |
| WO | WO 2008/104891 A2 | 9/2008 |
| WO | WO2008/140372 A1 | 11/2008 |

OTHER PUBLICATIONS

International Search Report and Written Opinion mailed Mar. 13, 2009 for PCT/IB2008/002694.
Partial International Search Report dated Oct. 6, 2006 for PCT/IB2006/001611.
International Search Report and Written Opinion dated Feb. 27, 2007 for PCT/IB2006/002680.
International Preliminary Report on Patentability dated Oct. 30, 2007 for PCT/IB2006/001611.
International Preliminary Report on Patentability mailed Dec. 16, 2008 for PCT/IB2006/002680.
International Search Report and Written Opinion dated Aug. 6, 2007 for PCT/IB2006/004077.
International Search Report and Written Opinion dated Sep. 12, 2008 for PCT/IB2008/001378.
International Search Report and Written Opinion mailed Mar. 24, 2009 for PCT/IB2008/002764.
International Preliminary Report on Patentability issued Jan. 19, 2010 for PCT/IB2008/002764.
International Search Report and Written Opinion mailed Jul. 17, 2009 for PCT/IB2008/002714.
International Preliminary Report on Patentability issued Jan. 19, 2010 for PCT/IB2008/002714.
International Search Report and Written Opinion dated Jan. 30, 2009 for PCT/IB2008/002598.
International Search Report and Written Opinion mailed Feb. 25, 2009 for PCT/IB2008/002566.
International Preliminary Report on Patentability issued Dec. 11, 2009 for PCT/IB2008/002598.
International Search Report and Written Opinion mailed Mar. 25, 2009 for PCT/IB2008/002682.
International Preliminary Report on Patentability issued Jan. 19, 2010 for PCT/IB2008/002682.
International Search Report and Written Opinion mailed Mar. 31, 2009 for PCT/IB2008/002681.
International Search Report and Written Opinion mailed Jul. 25, 2006 for PCT/IB2006/001114.
U.S. Appl. No. 12/789,125, filed May 27, 2010.
U.S. Appl. No. 12/748,205, filed Mar. 26, 2010.
International Preliminary Report on Patentability dated Aug. 28, 2007 for PCT/IB2006/001114.
Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.

* cited by examiner

METHOD OF FLAVOR ENCAPSULATION THROUGH THE USE OF A DRUM COATER

This application claims priority under 35 U.S.C. 119 to U.S. Provisional Application No. 60/929,885 entitled METHOD OF FLAVOR ENCAPSULATION THROUGH THE USE OF A DRUM COATER and filed on Jul. 16, 2007, the entire content of which is hereby incorporated by reference.

SUMMARY

A method of coating flavorants on oral pouch products is provided. A drum coater containing oral pouch products is rotated. A flavoring solution is sprayed to coat the oral pouch products while the oral pouch products are tumbling in the rotating drum.

DETAILED DESCRIPTION

Figure 1:
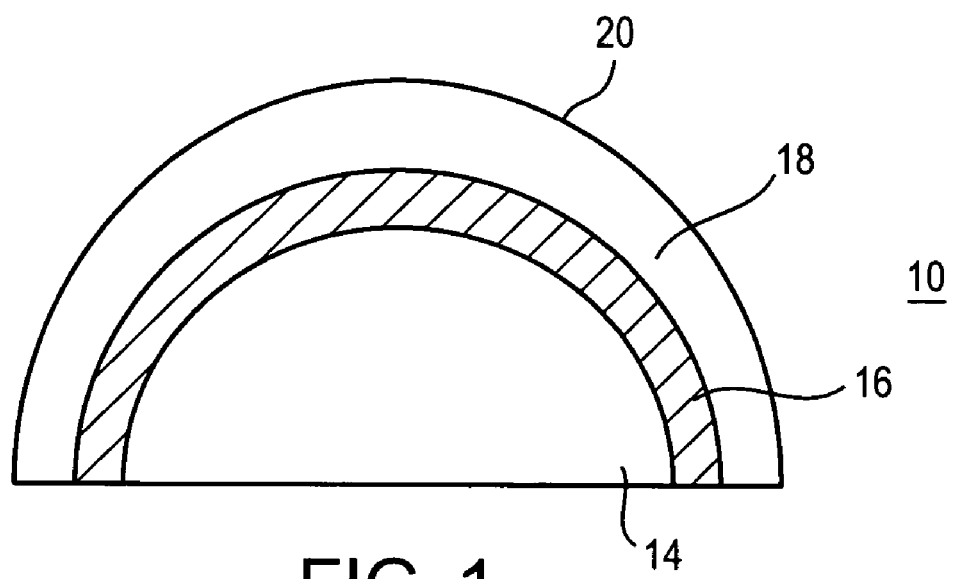
FIG. 1 is an illustration of an oral pouch product.

As described herein, an oral pouch product 10, shown in FIG. 1, can include a filling which provides an engaging, flavorful, aromatic, energizing, and/or soothing experience by delivering ingredients to a user in a consumable unit. Preferably, the oral pouch product 10 can be sucked, chewed and/or orally manipulated when placed in a user's mouth to release flavorants contained therein.

In a preferred embodiment, the oral pouch product 10 includes a porous pouch wrapper 14 enclosing an inner filling material 12 (shown in FIG. 2), and sized to fit comfortably in the mouth. At least one seam 16 closes an opening of the pouch which contains inner filling material 12 within the porous pouch wrapper 14.

Figure 2:
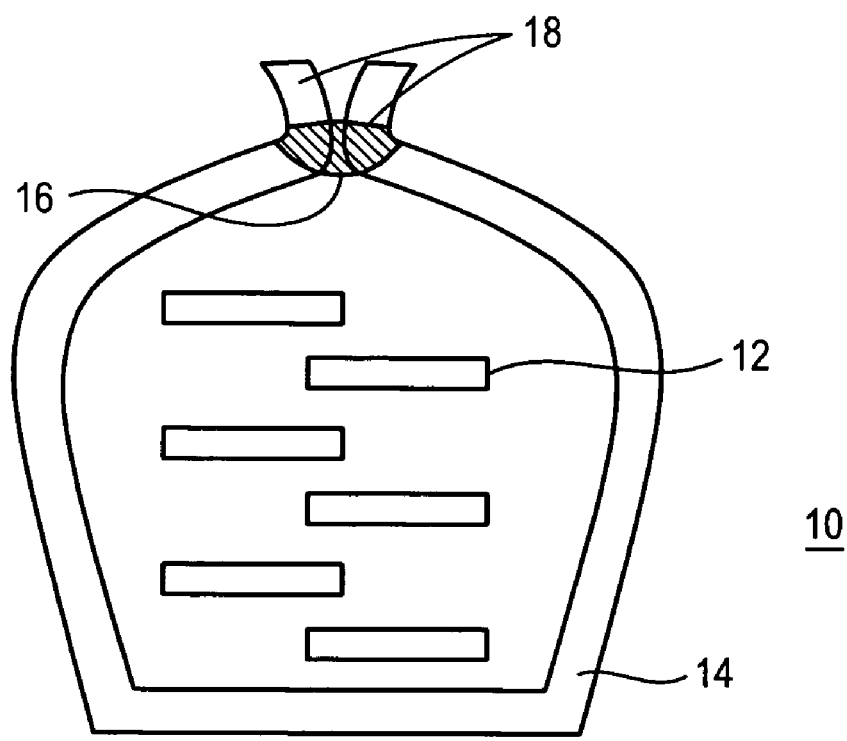
FIG. 2 is a cross-sectional view of the oral pouch product of FIG. 1.

As best seen in FIGS. 1 and 2, the oral pouch product 10 includes an inner filling material 12 contained in a porous pouch wrapper 14 that has a seam 16 along an edge of the porous pouch wrapper 14.

In a preferred embodiment, the inner filling material 12 may include botanical fibers, powders, extracts, capsules, microcapsules, beads, granules, liquids, semi-liquids, gels, and other food grade materials. The inner filling material 12 can form a matrix that is held together as a pliable mass by a binder. Preferably, the inner filling material 12 is a tobacco containing or tobacco-free filling which includes sweeteners, flavorants, coloring agents, functional ingredients, and the like. The inner filling material 12 can be loose or solid.

In a preferred embodiment, the binder is a food grade adhesive, gum or other binder. Suitable binders include, without limitation, sodium alginate, sugar, agar, guar gum, and the like. In a preferred embodiment, the binder is added in an effective amount such as about 10% to about 60% by weight of the oral pouch product 10.

In a preferred embodiment, capsules, microcapsules, and/or beads of various sizes can be included in the oral pouch product 10. Also preferably, about 2 to about 40 capsules, microcapsules, and/or beads are included in the oral pouch product 10, depending on the size of the final product and the size of the capsules, microcapsules, and/or beads. Preferably, the capsules, microcapsules, and/or beads range in size from about 0.1 mm to about 8 mm depending on the ingredients contained therein.

In an embodiment, the capsules, microcapsules, and/or beads have shells of varying thicknesses. Varying the thicknesses of the shells of the capsules, microcapsules, and/or beads included in the oral pouch product 10 allows for the ingredients contained in the capsules, microcapsules, and/or beads to be released at varying rates so as to prolong the flavor and/or functional experience. Preferably, the shells range in thickness from about 0.1 mm to about 7 mm, depending on the size of the capsules, microcapsules, and/or beads and the preferred dissolution rate. Preferably, the capsules, microcapsules, and/or beads having the thinnest shells dissolve first to release the enclosed flavors and functional ingredients. Capsules, microcapsules, and/or beads having thicker shells dissolve at a slower rate to provide continued flavor and functional ingredients.

In a preferred embodiment, the ingredients of the capsules, microcapsules, and/or beads are released by mastication, sucking, moisture, pH change, and the like. Each of the capsules, microcapsules, and/or beads included in the oral pouch product 10 may have the same or a different release mechanism to aid in varying the release rate of the capsules, microcapsules, and/or beads.

In a preferred embodiment, the inner filling material 12 can include functional ingredients such as, without limitation, chemesthesis agents, antioxidants, vitamins, soothing agents, energizing agents and the like. In a preferred embodiment, the soothing agents include, without limitation, chamomile, lavender, jasmine, and the like. Preferably, the energizing ingredients or vitamins include, without limitation, caffeine, taurine, guarrna, vitamin B6, vitamin B12, and the like. Suitable chemesthesis ingredients provide, without limitation, hot, spicy, or cooling flavors such as mint, menthol, cinnamon, pepper, and the like.

Preferably, the porous pouch wrapper 14 includes flavorants. The flavorants can be added in the form of a pouch liner or coating. Suitable flavorants include berry flavors such as, without limitation, pomegranate, acai, raspberry, blueberry, strawberry, and/or cranberry. Other suitable flavors include, without limitation, any natural or synthetic flavor or aroma, such as menthol, peppermint, spearmint, bourbon, scotch, whiskey, cognac, hydrangea, lavender, chocolate, licorice, citrus and other fruit flavors, such as apple, peach, pear, cherry, plum, orange and grapefruit, gamma octalactone, vanillin, ethyl vanillin, breath freshener flavors, spice flavors such as cinnamon, clove, nutmeg, sage, anise, and fennel, methyl salicylate, linalool, jasmine, coffee, bergamot oil, geranium oil, lemon oil, and ginger oil.

In a preferred embodiment, the inner filling material 12 can also include non-tobacco botanical components such as tea and tea extracts, coffee, coffee extracts, vegetables, vegetable extracts, and/or herbs and herb extracts.

In a preferred embodiment, the inner filling material 12 can include a powdered component to provide an additional layer of texture and/or flavor. Preferably, the powdered component is selected from, without limitation, dry sour cream, powdered sugar, powdered cocoa, powdered spices, and/or powdered herbs and other botanicals such as tea and/or tea extracts.

In another embodiment, the inner filling material 12 can include a viscous substance. In a preferred embodiment, the viscous substance is selected from substances such as honey, molasses, syrups, and the like.

In an embodiment wherein the inner filling material 12 includes natural or artificial sweeteners, preferred sweeteners include, without limitation, water soluble sweeteners such as monosaccharides, disaccharides, and polysaccharides such as xylose, ribose, sucrose, maltose, fructose, glucose, and mannose. In an embodiment, sugar alcohols such as sucralose can be included.

In a preferred embodiment, the inner filling material 12 completely fills the interior of the porous pouch wrapper 14. In another embodiment, the inner filling material 12 partially fills the interior of the porous pouch wrapper 14.

Preferably, the oral pouch product 10 is sized and configured to fit comfortably in a user's mouth. Preferably, the oral pouch product 10 delivers a flavor and/or functional ingredients to the user for a period of about one minute to about 1 hour. Preferably, the pouch is discarded after a single use.

In an embodiment, the oral pouch product 10 has maximum dimensions of about 0.1 inch to about 2.0 inches. In an embodiment, the oral pouch product 10 weighs between about 0.2 grams and 5.0 grams. The weight is predominately based on the weight of the enclosed inner filling material 12.

Preferred pouch shapes include, without limitation, a half moon, D-shape, sphere, rectangle, square, oval, pouch-shape, crescent, rod-shape, oblong, cylindrical, tea leaf, tear drop, or hourglass shapes. In an embodiment, the pouch-shape is similar to a ravioli or pillow shape. Other shapes may be utilized so long as the shapes are comfortable and fit discreetly in a user's mouth. In an embodiment, the shape of the pouch is indicative of the flavor. Thus, the pouch may be shaped as fruits, vegetables, or other objects. For instance, the pouch could be in the shape of a banana to indicate a banana flavor.

In a preferred embodiment, the porous pouch wrapper 14 of the oral pouch product 10 is made of a porous material including a flavored or non-flavored dissolvable coating. The coating can provide an initial flavor burst upon placement of the pouch in an oral cavity. Preferably, the porous material allows the flavors and functional ingredients contained in the inner filling material 12 to diffuse out of the porous pouch wrapper 14 and into the user's mouth. Preferred porous materials include, but are not limited to, films, gelatin, food casings, carrageenan, biopolymers, fabric and/or paper such as filter paper, papers used to construct tea bags, coffee filters, and the like. Preferably, the porous pouch wrapper 14 is of the type suitable for contact with food, such as materials used for packaging and/or handling foods.

Flavorants applied to the surface of porous pouch wrapper 14 can oxidize or evaporate after application to the porous pouch wrapper 14, if not adequately protected. Described herein is a novel method of encapsulating flavorants with encapsulants such as gum arabic or modified food starch, either individually or in combination. These encapsulating agents can be dissolved in water at concentrations up to about 55 weight % with low apparent viscosity. This allows high flavor loading of the carrier and ultimately high flavor loading of the pouches. The high solids content of the flavor solution permits faster drying, as less water needs to be evaporated and pouches can be coated without wetting of the pouches. The encapsulation produces a shelf-stable flavor that can be instantly released when consumed.

Figure 3A:
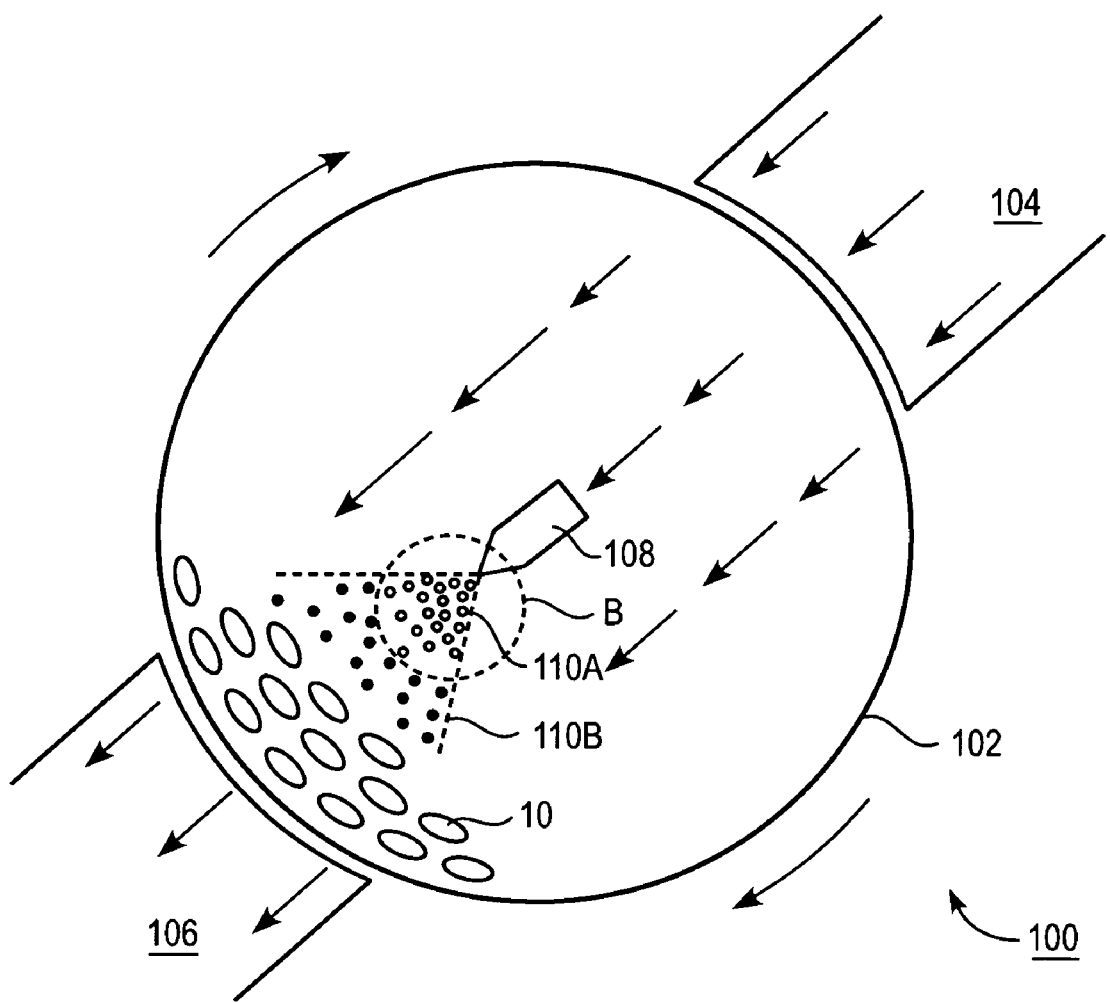
FIG. 3A is a cross-sectional view of a portion of a drum coater.
Figure 3B:
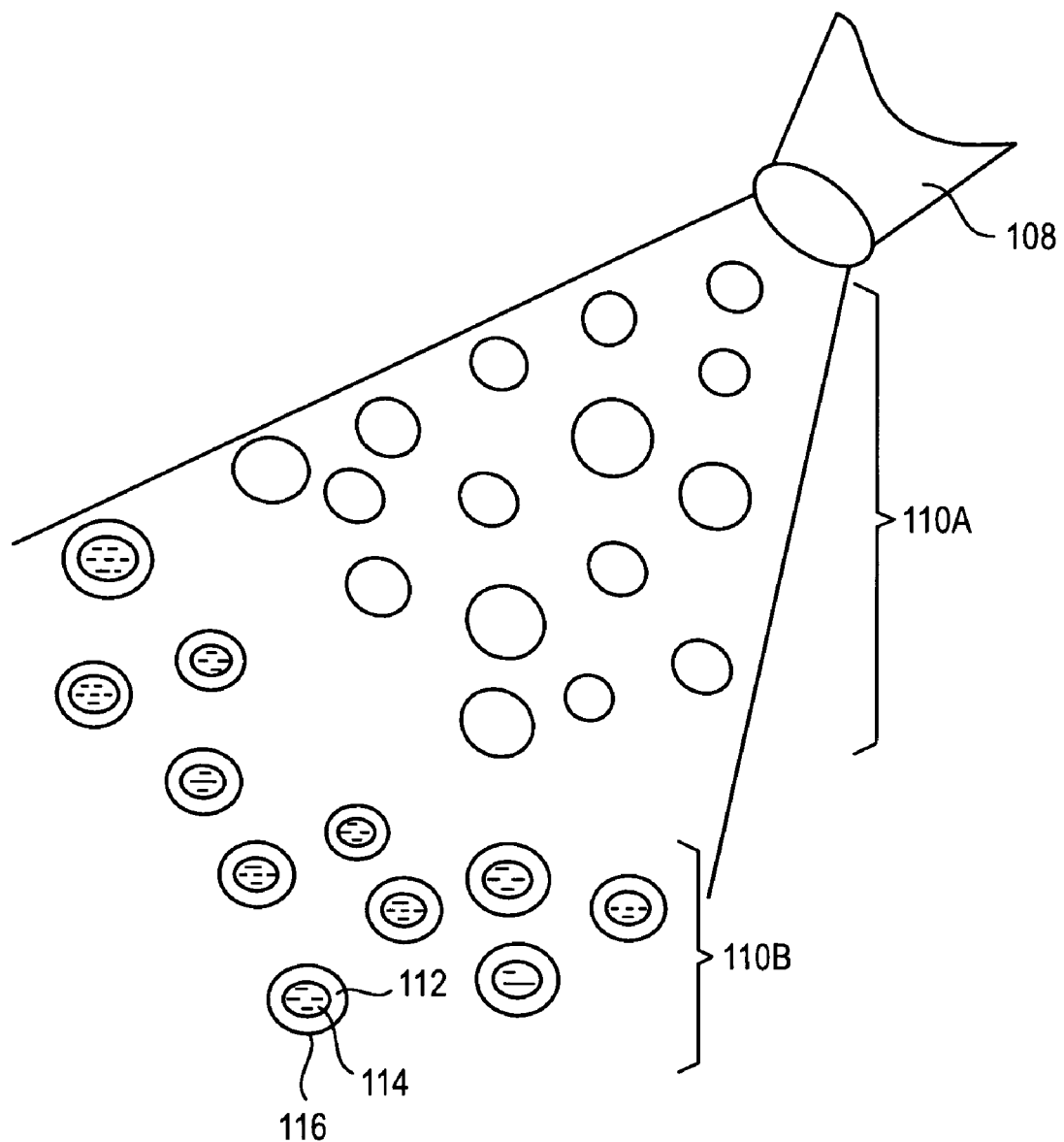
FIG. 3B is an enlarged cross-sectional view of a spray nozzle spraying droplets of flavoring solution.

FIGS. 3A and 3B illustrate an embodiment for coating oral pouch products 10 with an encapsulated flavorant with drum coater 100. For example, drum coater 100 is a Laboratory Development Coating System (LDCS) with a 1.3 liter capacity, manufactured by VECTOR Corporation, located in Marion, Iowa. Oral pouch products 10 can be placed in a rotating drum 102 (direction of rotation is indicated by the arrows). For example, in a small scale demonstration, between about 100 grams and about 200 grams of oral pouch products 10 can be placed in rotating drum 102. During rotation of rotating drum 102, heated air can flow through rotating drum 102 from inlet 104 to exhaust 106 (the direction of air flow is indicated by arrows). Spray nozzle 108 is located in the interior of the rotating drum 102 and atomizes flavoring solution into droplets 110A to coat oral pouch products 10 while they are tumbling in rotating drum 102. In another embodiment, multiple spray nozzles can be used to coat the oral pouch products 10. The flow rate of the flavoring solution is controlled by any suitable pumping arrangement such as a peristaltic pump which delivers the flavoring solution to spray nozzle 108. Examples of other pumping arrangements include bellows, centrifugal, diaphragm, drum, flexible liner, flexible impeller, gear or piston pumps.

A preferred flavorant solution contains water, at least one flavorant, an encapsulation agent and an adhesive agent. Before contacting the oral pouch products 10, water is removed from droplets 110A, transforming the droplets into encapsulated flavorant particles 110B, which adhere to oral pouch products 10 and form a uniform coating thereon. The flavoring solution is preferably applied such that it does not wet oral pouch products 10 during coating. The solids content of the flavoring solution can be up to 60 weight %, which makes drying faster and easier to control due to less water to evaporate.

The flavoring solution can optionally contain an emulsifying agent if the flavorant is oil-based, to prevent separation of the flavoring solution into a water phase and an oil phase. To prevent agglomeration, the flavoring solution can be mixed under high-shear agitation and subjected to homogenization before spraying.

Flavorants can be divided into several categories, including savory, sweet, vegetable, dairy, spice, or wine and distilled beverages.

Examples of savory flavorants can include beef, pork, chicken, turkey, lamb, seafood, ham, meat broth, nut, macadamia, peanut, pecan, pine, walnut, pistachio, almond or chestnut.

Examples of sweet flavorants can include strawberry, raspberry, cranberry, banana, peach, mango, passion fruit, green tea, red tea, black tea, apple, grape, caramel, watermelon, chocolate or coffee.

Examples of vegetable flavorants can include celery, lettuce, broccoli, tomato, green pepper, cucumber, carrot, radish, horseradish, washbi, beet, leek, shallot, onion or garlic.

Examples of dairy flavorants include butter, cheese, sweet cream, sour cream, yoghurt, buttermilk, vanilla or ice cream.

Examples of spice flavorants can include clove, oregano, lemon, lime, jasmine, garlic, ginger, eucalyptus, geranium, dill, cumin, cardamom, cassia, coriander, rose, rosemary, basil, star anise, sweet fennel, sweet marjoram, thyme, violet leaf, spearmint or peppermint.

Examples of wine and distilled beverage flavoring agents, red wine, white wine, whisky, brandy, cognac, rum or gin.

Examples of encapsulation agents include modified food starch (e.g., National Starch and Chemical HI-CAP 100) or gum arabic, used individually or in combination. Modified food starch and gum arabic can be added to water in concentrations up to 55 weight % while retaining a relatively low viscosity at room temperature (75° F.) of between about 100 centipoise and about 1,200 centipoise, as measured on a BROOKFIELD DV-II digital viscometer (Spindle 4, 100 RPM).

Examples of adhesive agents include sodium alginate (e.g., PROTANAL® GP 2650), carrageenan or hydrocolloids, used individually or in combination.

An example of an emulsifier includes diacetyl tartrate ester of monoglyceride or DATEM (e.g., DANISCO PANODAN® 150K).

The processing parameters of drum coater 100 (i.e., rotation speed, airflow rate, air temperature, spray nozzle pressure) are adjusted such that substantially all of the water is removed from droplets 110A before they contact the pouches, i.e., the atomized solution forms encapsulated flavorant particles 110B before coating the oral pouch products 10. FIG. 3B, an enlarged view of region B in FIG. 3A, illustrates the transition in structure from droplets 110A to encapsulated flavorant particles 110B as water is removed. Droplet 110A contains a flavoring solution including water, a flavorant, an encapsulation agent and an adhesive agent in the solution as it exits spray nozzle 108. However, when the water is removed from droplet 110A, its structure is altered to that of encapsulated flavorant particles 110B, in which the encapsulation agent forms an encapsulation layer 112 enveloping flavorant 114. An adhesive layer 116, formed from the adhesive agent, coats the encapsulation layer 112, promoting adhesion of encapsulated flavorant particles 110B to oral pouch products 10.

In an exemplary embodiment, rotating drum 102 can be rotated at a speed of between about 20 and about 40 revolutions per minute (RPM). For example, the speed can be about 30 RPM. Heated air can flow through rotating drum 102 from inlet 104 to exhaust 106 (the direction of air flow is indicated by arrows). The air flow rate can range from about 20 cubic feet per minute (CFM) to about 60 CFM. For example, the air flow rate is about 40 CFM. The temperature of the heated air flowing from inlet 104 into rotating drum 102 can range from about 80° C. to about 95° C. For example, the temperature of the heated air can be about 90° C. The temperature of the heated air flowing from rotating drum 102 into exhaust 106 can range from about 50° C. to about 60° C. The nozzle pressure of spray nozzle 108 can range from about 3 psi to about 30 psi. For example, the nozzle pressure can be about 26 psi. The peristaltic pump delivering flavoring solution to the spray nozzle 108 can be operated at a speed ranging from about 20 RPM to about 25 RPM.

The amount of encapsulated flavorant particles 110B coated on oral pouch product 10, as a percentage of add-on weight, can range from about 2% to about 200% of the uncoated pouch weight (e.g., 2-10%, 10-20%, 20-30%, 30-40%, 40-50%, 50-60%, 60-70%, 70-80%, 80-90%, 90-100%, 100-110%, 110-120%, 120-130%, 130-140%, 140-150%, 150-160%, 160-170%, 170-180%, 180-190%, 190-200%). For example, the add-on weight can be about 5 to 80%, depending on losses during the coating operation.

The process of coating encapsulated flavorant particles 110B on oral pouch products 10 can be repeated multiple times on the same oral pouch products 10 with multiple flavors (e.g., passion fruit and mango). For example, oral pouch products 10 are coated by spraying a first flavoring solution (e.g., passion fruit) through spray nozzle 108 in drum coater 100, as described above. Once completed, the same oral pouch products 10 remain in the drum coater 100 and the process is repeated by spraying a second flavoring solution (e.g., mango) through spray nozzle 108 in drum coater 100.

EXAMPLE

A 1,000 gram peppermint flavoring solution was prepared using ingredients, listed in TABLE 1. To prevent agglomeration, the ingredients were mixed under high-shear agitation and homogenized.

TABLE 1

| Ingredient | Preferred Amount (Weight %) | More Preferred Amount (Weight %) |
|---|---|---|
| Sodium Alginate (PROTANAL ® GP 2650) | 0-5 | 0.5 |
| Modified Food Starch (HI-CAP 100) | 10-30 | 17.5 |
| Gum Arabic | 5-25 | 7.5 |
| Sucrose | 1-10 | 4 |
| Sucralose | 0-3 | 1 |
| DATEM (DANISCO PANODAN ® 150K) | 0-1 | 0.2 |
| Citric Acid | 0-3 | 0.5 |
| Peppermint Oil | 1-10 | 2 |
| Water | 40-70 | 66.8 |

Sucrose, sucralose, citric acid and sodium alginate were mixed thoroughly to form a pre-mixture. This pre-mixture was slowly added to heated water (140° F.) under high-shear agitation using a high-shear mixture operated at 3,000 RPM. Next, the modified food starch and gum arabic were slowly added to the heated solution, which remained agitated under high shear. The temperature of the solution was increased to 180° F. DATEM and peppermint oil were blended before addition to the heated water (180° F.) under high-shear agitation. Finally, the entire solution was processed by a homogenizer operated at 3,500 psi (e.g., NIRO SOAVI Twin Panda 600) and quickly cooled to room temperature. This process produced an agglomeration-free flavoring solution. The viscosity of the peppermint solution at room temperature (75° F.) was determined to be about 375 centipoise, as measured on a BROOKFIELD DV-II digital viscometer (Spindle 4, 100 RPM).

Two hundred grams of oral pouch products were placed in a 1.3 liter capacity drum coater (e.g., VECTOR Corporation LDCS). Coating process conditions were as follows: drum rotation speed of 30 RPM, air flow rate of 40 CFM, air inlet temperature of 90° C., and a spray nozzle pressure of 26 psi. The 100 gram peppermint flavoring solution was supplied to the spray nozzle using a peristaltic pump operating at 20 RPM, which produced a spray rate of about 6.7 grams/minute. The process of spraying the peppermint flavoring solution on the tumbling oral pouch products was completed in about 15 minutes. This process produced peppermint flavored oral pouch products with an add-on weight coating of about 16%.

While the foregoing has been described in detail with reference to specific embodiments thereof, it will be apparent to one skilled in the art that various changes and modifications may be made, and equivalents thereof employed, without departing from the scope of the claims.

What is claimed is:

1. A method of coating flavorants on oral pouch products comprising:
    rotating a drum coater containing oral pouch products;
    spraying a flavoring solution to coat the oral pouch products while the oral pouch products are tumbling in the rotating drum coater, and
    flowing heated air through the drum coater so as to remove water from droplets of the flavoring solution to form encapsulated flavorant particles before the droplets contact and coat the oral pouch products;
    wherein the flavoring solution contains water, a flavorant, an encapsulation agent, and an adhesive agent.

2. The method of claim 1, wherein the spraying is performed with one or more spray nozzles at a nozzle pressure between about 3 psi and about 30 psi to atomize the flavoring solution into droplets.

3. The method of claim 1, wherein the heated air has a temperature sufficient to remove water from the droplets to form encapsulated flavorant particles before the droplets contact the oral pouch products, the encapsulation agent forming an encapsulation layer which envelopes the flavorant; and the adhesive agent forming an adhesive layer on the encapsulation layer and promotes adhesion of the droplets to the oral pouch products.

4. The method of claim 1, wherein the oral pouch products include a tobacco-free filling in a porous pouch wrapper, sized to fit comfortably in a human mouth.

5. The method of claim 3, wherein removing the water from the droplets comprises flowing heated air from about 80° C. to about 95° C. through the rotating drum with an air flow rate from about 20 cubic feet per minute to about 60 cubic feet per minute.

6. The method of claim 1, wherein the spraying is terminated when an add-on weight to the oral pouch products is between about 2% and about 200%.

7. The method of claim 1, wherein the drum coater is rotated between about 20 and about 40 revolutions per minute.

8. The method of claim 1, wherein the flavorant is between about 1% by weight and about 10% by weight of the flavoring solution.

9. The method of claim 1, wherein the adhesive agent is up to about 5% by weight of the flavoring solution.

10. The method of claim 1, wherein the encapsulating agent is between about 15% by weight and about 55% by weight of the flavoring solution.

11. The method of claim 1, wherein the encapsulating agent is gum arabic, modified food starch or mixtures thereof.

12. The method of claim 1, wherein the adhesive agent is sodium alginate, carrageenan, hydrocolloids or mixtures thereof.

13. The method of claim 1, wherein the flavorant is oil-based, the flavoring solution includes an emulsifying agent, the flavoring solution is mixed by applying high-shear agitation and homogenization before spraying the flavoring solution.

14. The method of claim 1, wherein the flavorants include:
(a) savory, sweet, vegetable, dairy, spice, or wine and distilled beverages;
(b) the savory flavorants include beef, pork, chicken, turkey, lamb, seafood, ham, meat broth, nut, macadamia, peanut, pecan, pine, walnut, pistachio, almond or chestnut;
(c) the sweet flavorants include strawberry, raspberry, cranberry, banana, peach, mango, passion fruit, green tea, red tea, black tea, apple, grape, caramel, watermelon, chocolate or coffee;
(d) the vegetable flavorants include celery, lettuce, broccoli, tomato, green pepper, cucumber, carrot, radish, horseradish, washbi, beet, leek, shallot, onion or garlic;
(e) the dairy flavorants include butter, cheese, sweet cream, sour cream, yogurt, buttermilk, vanilla or ice cream;
(f) spice flavorants include clove, oregano, lemon, lime, jasmine, garlic, ginger, eucalyptus, geranium, dill, cumin, cardamom, cassia, coriander, rose, rosemary, basil, star anise, sweet fennel, sweet marjoram, thyme, violet leaf, spearmint or peppermint; and/or
(g) the wine and distilled beverages flavorants include red wine, white wine, whisky, brandy, cognac, rum or gin.

15. The method of claim 1, further comprising spraying a different flavoring solution to coat the same oral pouch products while the oral pouch products are tumbling in the rotating drum coater.

16. The method of claim 1, wherein a flow rate of the flavoring solution is controlled by a pumping arrangement; or a peristaltic pump operated between about 20 and about 25 RPM.

17. The method of claim 1, wherein the flavoring solution has a viscosity of between about 100 centipoise and about 1,200 centipoise at room temperature.

18. The method of claim 13, wherein the emulsifying agent is diacetyl tartrate ester of monoglyceride.

* * * * *